United States Patent Office 3,382,259
Patented May 7, 1968

3,382,259
2α-FLUORO-Δ⁴-PREGNENES
John Edwards and Howard J. Ringold, Mexico City,
Mexico, assignors, by mesne assignments, to Syntex
Corporation, a corporation of Panama
No Drawing. Filed Mar. 24, 1960, Ser. No. 17,244
Claims priority, application Mexico, June 1, 1959,
54,717
21 Claims. (Cl. 260—397.4)

The present invention relates to novel cyclopentanophenanthrene compounds and to the process of preparing the same.

More specifically the invention relates to novel 2α-fluoro-Δ⁴-pregnene-3,20-dione and to 2α-fluoro-Δ⁴-pregnen-21-ol-3,20-dione and to their 16-methyl and 17α-hydroxy derivatives as well as to the esters thereof.

The novel compounds can be represented by the following formulas:

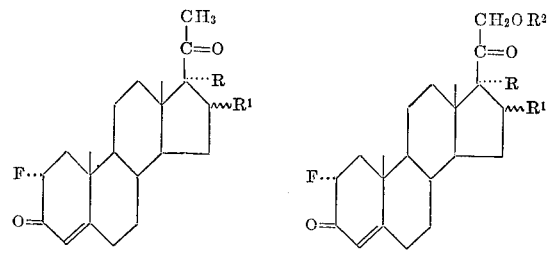

In the above formulas, R indicates hydrogen, hydroxy or acyloxy; $R^1$ represents hydrogen, α-methyl or β-methyl; and $R^2$ represents hydrogen or acyl. The acyl group in each instance is derived from a hydrocarbon carboxylic acid containing from 1 to 12 carbon atoms, or acids such as sulfonic acids, sulfuric acid, or phosphoric acid. The carboxylic acids may be saturated or unsaturated, straight-chain or branched chain aliphatic, cyclic-aliphatic, aromatic, and may be substituted with amino, halogen or alkoxy groups containing from 1 to 8 carbon atoms. Typical examples of such ester groups are the acetate, propionate, butyrate, hemisuccinate, enanthate, caproate, benzoate, aminoacetate, trimethylacetate, phenoxyacetate, cyclopentylpropionate, phenylpropionate and β-chloropropionate. The esterified compounds may also be in the form of water-soluble salts such as, for example, the alkali metal salts of the hemisuccinates or the disodium salt of a phosphate or the hydrohalide salt of esters formed with amino acids.

The wavy line at C–16 designates both the α and β configurations.

The novel compounds of this invention are active progestational compounds which exhibit anti-androgenic activity, anti-estrogenic activity, anti-ovulatory activity, and anti-gonadotrophic activity.

The following equation illustrates a process for the preparation of the novel compounds of the present invention:

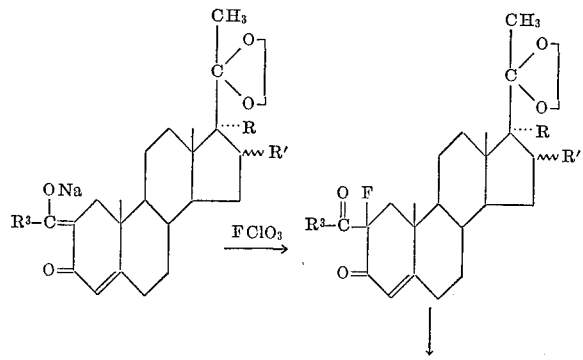

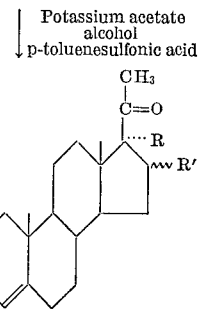

In the above equation R and R' have the same meaning as previously set forth. $R^3$ represents hydrogen or a carboalkoxy group, preferably carbomethoxy or carboethoxy.

In practicing the process above outlined, the starting materials are prepared by reacting Δ⁵-pregnen-3β-ol-20-one or Δ⁵-pregnene-3β,17α-diol-20-one with a glycol such as ethylene glycol in the presence of p-toluenesulfonic acid under reflux conditions to produce the 20-ethylenedioxy-Δ⁵-pregnen-3β-ol or the 20-ethylenedioxy-Δ⁵-pregnen-3β,17α-diol, which is then subjected to oxidation under Oppenauer conditions to yield the corresponding 20-cyclic ketal of Δ⁴-pregnene-3,20-dione or of Δ⁴-pregnen-17α-ol-3,20-dione. For the Oppenauer oxidation, the usual aluminum alkoxides, as for example, aluminum isopropylate, may be used. An inert solvent such as toluene together with a hydrogen acceptor, preferably a ketone such as cyclohexanone are also present.

The resulting 20-cyclic ketals of Δ⁴-pregnene-3,20-dione or of Δ⁴-pregnen-17α-ol-3,20-dione may then be treated either with an alkyl formate such as ethyl formate or an alkyl oxalate such as methyl oxalate or ethyl oxalate in the presence of an alkali metal alkoxide such as sodium methoxide or an alkali metal hydride such as sodium hydride under an atmosphere of nitrogen and in an inert solvent, for example, benzene or dioxane, to produce the sodium salts of 2-hydroxymethylene-20-ethylenedioxy-Δ⁴-pregnen-3-one or of 2-alkoxyoxalyl-20-ethylenedioxy-Δ⁴-pregnen-3-one or of their 17α-hydroxy derivatives.

The introduction of the 2α-fluoro moiety is effected by suspending either of the above-mentioned sodium salts in an inert solvent such as benzene or methanol and introducing a stream of perchloryl fluoride for a period of time varying from a few minutes to a few hours. From the neutral mixture thus obtained, there is isolated the 2-fluoro-2-aldehydo- or the 2-fluoro-2-alkoxyoxalyl-20-ethylenedioxy-Δ⁴-pregnen-3-ones or the corresponding 17α-hydroxy derivatives. By alkaline cleavage such as refluxing with potassium acetate in methanol, followed by hydrolysis of the 20-ketal group, for example as by treatment with small amounts of p-toluenesulfonic acid in acetone, there is obtained the 2α-fluoro-Δ⁴-pregnene-3,20-dione or 2α-fluoro-Δ⁴-pregnen-17α-ol-3,20-dione, which may then be esterified by conventional means.

Similarly, the corresponding 16-methyl compounds are formed in the manner outlined above.

By monoiodination at C–21 followed by acetolysis as set forth in the U.S. Patent 2,874,154 to Stork et al., there is introduced an acetoxy group at C–21 to thus form the 21-acetate of 2α-fluoro-Δ⁴-pregnen-21-ol-3,20-dione and of the corresponding 17α-hydroxy derivative. The latter compound is further esterified at C–17α by reaction with the desired carboxylic acid anhydride in the presence of p-toluenesulfonic acid and anhydrous benzene; by the reaction with acetic acid and acetic anhydride in the presence of p-toluenesulfonic acid, there is formed the 17,21-diacetate of Δ⁴-pregnene-17α,21 - diol - 3,20-dione. The 21-acetoxy group may be hydrolyzed by conventional methods and the resulting 21-hydroxyl group can be reesterified with another carboxylic acid anhydride.

The following specific examples serve to illustrate but are not intended to limit the present invention:

Example 1

A mixture of 5 g. of Δ⁵-pregnen-3β-ol-20-one, 150 cc. of anhydrous benzene, 60 cc. of ethylene glycol distilled over sodium hydride, and 800 mg. of p-toluenesulfonic acid was refluxed for 12 hours with the use of a water separator. The mixture was cooled, treated with an excess of 5% aqueous sodium bicarbonate solution, the organic layer was separated, washed with water, dried and the solvent was evaporated. The residue crystallized from acetone-hexane gave 20-ethylenedioxy-Δ⁵-pregnen-3β-ol.

Traces of moisture were removed from a solution of 5 g. of the above compound in 240 cc. of toluene and 50 cc. of cyclohexanone by azeotropic distillation of about 20 cc. of solvent; a solution of 3.8 g. of aluminum isopropylate in 20 cc. of anhydrous toluene was added to the mixture which was then refluxed for 2 hours. It was then neutralized with acetic acid, the solvents were removed by steam distillation, the residue was cooled and the product was extracted with ethyl acetate; the extract was washed with water to neutral, dried over anhydrous sodium sulfate, the ethyl acetate was evaporated almost to dryness and the residue was cooled and triturated with hexane, thus producing 20-ethylenedioxy-Δ⁴-pregnen-3-one in crude form, which was used for the next step without further purification.

To a solution of 6 g. of the above ketal in 120 cc. of anhydrous benzene was slowly added 6 cc. of ethyl formate and then 2.6 g. of sodium hydride suspended in mineral oil, with stirring and cooling under an atmosphere of nitrogen. The mixture was stirred at room temperature for 24 hours, hexane was added until complete precipitation and the product was collected by filtration and dried under vacuum. There was thus obtained the sodium salt of the 20-cycloethyleneketal of 2-hydroxymethylene-progesterone which was used for the next step without further purification.

Example 2

To a solution of 6 g. of the 20-cycloethyleneketal of progesterone in 100 cc. of anhydrous benzene was added 3.2 g. of ethyl oxalate and then 1 g. of sodium methoxide and the mixture was stirred for 5 hours under an atmosphere of nitrogen. The precipitate was collected, washed with hexane and dried under vacuum, thus affording as main product the crude sodium salt of 2-ethoxyoxalyl-20-ethylenedioxy - Δ⁴ - pregnen - 3 - one, which was used for the next step without further purification.

Example 3

Exactly as described in Example 1, there was formed the 20-cycloethyleneketal of Δ⁵-pregnene - 3β,17α-diol-20-one; the latter was oxidized to the 20-cycloethyleneketal of 17α-hydroxyprogesterone and then treated with ethyl formate to produce the sodium salt of the 20-cycloethyleneketal of 2 - hydroxymethylene - 17α - hydroxyprogesterone.

Example 4

By treatment of the 20-cycloethyleneketal of 17α-hydroxyprogesterone with ethyl oxalate, as described for this reaction in Example 2, there was obtained the sodium salt of 2-ethoxyoxalyl - 20 - ethylenedioxy - Δ⁴ - pregnen-17α-ol-3-one.

Example 5

In accordance with the procedure of the preceding examples, the 16α-methyl, and 16β-methyl derivatives of Δ⁵-pregnen-3β-ol-20-one and of Δ⁵-pregnene-3β,17α-diol-20-one (disclosed by Marker, J. Am. Chem. Soc., 64, 1280 (1942); Romo et al., Bol. Inst. Quim. Mex., 4, 125 (1952); U.S. Patent No. 2,925,415, and copending application Ser. No. 773,830, filed Nov. 14, 1958, now abandoned), were converted into the 20-cycloethyleneketals of the sodium salts of the correspondingly substituted 2-hydroxymethylene and 2-ethoxyoxalyl derivatives of progesterone or of its 17α-hydroxy analog.

Example 6

A stream of perchloryl fluoride was introduced into a suspension of 5 g. of the sodium salt of the 20-cycloethyleneketal of 2-hydroxymethylene-progesterone in 500 cc. of benzene, at room temperature, with stirring, and for 1 hour. The mixture was washed with water, dried over anhydrous sodium sulfate and the benzene was evaporated; the oily residue was dissolved in 500 cc. of methanol, treated with 20 g. of potassium acetate and refluxed for 8 hours; after concentrating to a small volume under reduced pressure it was diluted with water, the product was extracted with methylene chloride, the extract was washed with water, dried over anhydrous sodium sulfate and the solvent was evaporated, thus leaving as a residue the 20-cycloethyleneketal of 2α-fluoro-progesterone, which was used for the next step without further purification.

The above compound was dissolved in 200 cc. of acetone, treated with 2 g. of p-toluenesulfonic acid monohydrate and 5 cc. of water and the mixture was kept overnight at room temperature. Most of the acetone was then evaporated under reduced pressure diluted with water and the product was extracted with methylene chloride, washed with water, dried over anhydrous sodium sulfate and the solvent was evaporated. Chromatography of the residue on neutral alumina yielded 2α-fluoroprogesterone.

Example 7

In the preceding example the soduim salt of the 20-cycloethyleneketal of 2-hydroxymethylene-progesterone was substituted by the sodium salt of the 20-cycloethyleneketal of 2-ethoxyoxalyl-progesterone to produce finally 2α-fluoro-progesterone, identical with the final compound of the preceding example.

Example 8

The method of Example 6 was applied to the sodium salt of 2-hydroxymethylene-16α-methyl-20-ethylenedioxy-Δ⁴-pregnen-3-one to produce finally 16α-methyl-2α-fluoroprogesterone.

Example 9

By following the method described in Example 7, the sodium salt of 16β-methyl-2-ethoxyoxalyl-20-ethylenedioxy-Δ⁴-pregnen-17α-ol-3-one was converted into 16β-methyl-2α-fluoro-17α-hydroxyprogesterone.

Example 10

5 g. of 2α-fluoro-17α-hydroxyprogesterone was prepared in accordance with the method described in Example 6, starting from the sodium salt of the 20-cycloethyleneketal of 2-hydroxymethylene-17α-hydroxyprogesterone; it was then treated with 5 g. of p-toluenesulfonic acid in mixture with 125 cc. of acetic acid and 25 cc. of acetic anhydride and kept overnight at room temperature. Most of the liquid was removed by distillation under reduced pressure, the residue was diluted with water, heated for half an hour on the steam bath, cooled and the precipitate was collected, washed with water, dried and recrystallized from acetone-hexane, thus giving the acetate of 2α-fluoro-17α-hydroxyprogesterone.

Example 11

A solution of 2 g. of 2α-fluoro-17α-hydroxy progesterone in 100 cc. of anhydrous benzene was treated with 4 g. of cyclopentylpropionic anhydride and 1 g. of p-toluenesulfonic acid and the mixture was kept at 25° C. for 48 hours, then washed with water, dried over anhydrous sodium sulfate and the solvent was evaporated under reduced pressure. The residue was purified by chromatography on neutral alumina, thus yielding the cyclopentylpropionate of 2α-fluoro-17α-hydroxyprogesterone.

Example 12

In accordance with the method described in Example 6, there was prepared 8 g. of 2α-fluoro-17α-hydroxyprogesterone, which was mixed with 60 cc. of redistilled tetrahydrofuran and 36 cc. of methanol, and treated with vigorous stirring with 12 g. of powdered calcium oxide and then with 12 g. of iodine, maintaining the temperature around 25° C.; the stirring was continued at 25° C. until the color of iodine disappeared, 1 lt. of methylene chloride was added, the solid was removed by filtration and the filtrate was washed with 10% aqueous sodium thiosulfate solution and water, dried over anhydrous sodium sulfate and evaporated to dryness, under reduced pressure and at room temperature. The residue of 2α-fluoro-21-iodo-17α-hydroxyprogesterone was refluxed with 1 lt. of dry acetone and 20 g. of anhydrous potassium acetate for 18 hours, concentrated to a small volume, diluted with water and the precipitate was collected, washed with water, dried and recrystallized from acetone-hexane. There was thus obtained the 21-acetate of 2α-fluoro-Δ⁴-pregnene-17α,21-diol-3,20-dione.

A mixture of 4 g. of the above compound and 100 cc. of 0.5% methanolic potassium hydroxide solution was stirred at 5° C. for 1 hour; it was then acidified with acetic acid, concentrated to a small volume, diluted with water and the precipitate was collected, washed with water, dried and recrystallized from acetone-hexane, thus furnishing the free 2α-fluoro-Δ⁴-pregnene-17α,21-diol-3,20-dione.

Example 13

By following the method described in the preceding example 2α-fluoro-progesterone (Example 6) was acetoxylated at C-21 to produce the 21-acetate of 2α-fluoro-desoxycorticosterone and the free 2α-fluoro-desoxycorticosterone.

Example 14

In accordance with the method described in Example 12, there was prepared 5 g. of the 21-acetate of 2α-fluoro-Δ⁴-pregnene-17α,21-diol-3,20-dione and the latter was treated with acetic anhydride and acetic acid in the presence of p-toluenesulfonic acid according to the method of Example 10. There was thus obtained the diacetate of the 2α-fluoro analog or Reichstein's compound "S."

Example 15

The methods of Examples 12 and 13 were applied to the respective compound further substituted at C–16; there were thus prepared, for example, 2α-fluoro-16α-methyl and 2α-fluoro-16β-methyl derivatives of Reichstein's compound "S" and of desoxycorticosterone.

We claim:
1. A compound of the following formula

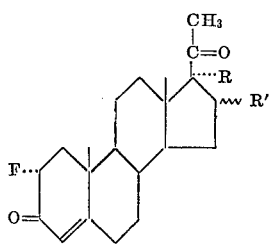

wherein R is selected from the group consisting of hydroxy and a hydrocarbon carboxylic acyloxy group containing from 1 to 12 carbon atoms; R' is selected from the group consisting of hydrogen, α-methyl and β-methyl.

2. A compound of the formula:

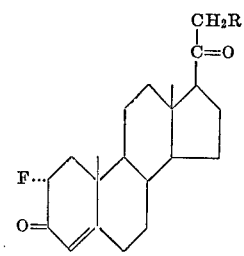

wherein R is selected from the group consisting of hydroxy and acetoxy.

3. 2α-fluoro-17α-hydroxyprogesterone.
4. 2α-fluoro-17α-acetoxyprogesterone.
5. 2α-fluoro-17α-cyclopentylpropionoxyprogesterone.
6. 16β-methyl-2α-fluoro-17α-hydroxyprogesterone.
7. A compound of the following formula:

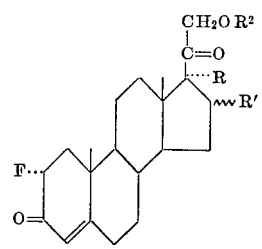

wherein R is selected from the group consisting of hydrogen, hydroxy and a hydrocarbon carboxylic acyloxy group containing from 1 to 12 carbon atoms; R' is selected from the group consisting of hydrogen, α-methyl and β-methyl; and R² is selected from the group consisting of hydrogen and hydrocarbon carboxylic acyl containing from 1 to 12 carbon atoms.

8. 2α-fluoro-Δ⁴-pregnene-17α,21-diol-3,20-dione.
9. 2α-fluoro-Δ⁴-pregnene-17α,21-diol - 3,20 - dione 21-acetate.
10. 2α-fluoro-Δ⁴-pregnene-17α,21-diol-3,20-dione 17,21-diacetate.
11. 2α-fluoro-Δ⁴-pregnen-21-ol-3,20-dione 21-acetate.
12. 16α - methyl - 2α - fluoro-Δ⁴-pregnene-17α,21-diol-3,20-dione.
13. 16α - methyl - 2α - fluoro-Δ⁴-pregnene-17α,21-diol-3,20-dione 21-acetate.
14. 16α - methyl - 2α - fluoro-Δ⁴-pregnene-17α,21-diol-3,20-dione 17,21-diacetate.
15. 16β-methyl-2α-fluoro-Δ⁴-pregnene - 17α,21 - diol-3,20-dione.
16. 16β-methyl - 2α - fluoro-Δ⁴-pregnene-17α,21-diol-3,20-dione 21-acetate.
17. 16β-methyl-2α-fluoro-Δ⁴-pregnene - 17α,21 - diol-3,20-dione 17,21-diacetate.
18. 16α-methyl-2α-fluoro-Δ⁴-pregnen - 21 - ol - 3,20-dione.
19. 16β - methyl - 2α - fluoro-Δ⁴-pregnen-21-ol-3,20-dione.
20. 16α - methyl - 2α - fluoro-Δ⁴-pregnen-21-ol-3,20-dione 21-acetate.
21. 16β-methyl-2α-fluoro - Δ⁴ - pregnen - 21 - ol-3,20 dione 21-acetate.

References Cited
UNITED STATES PATENTS
2,961,441 11/1960 Bogert et al. _____ 260—239.55

LEWIS GOTTS, Primary Examiner.

L. H. GASTON, M. LIEBMAN, Examiners.

H. A. FRENCH, Assistant Examiner.

UNITED STATES PATENT OFFICE
CERTIFICATE OF CORRECTION

Patent No. 3,382,259                                           May 7, 1968

John Edwards et al.

It is certified that error appears in the above identified patent and that said Letters Patent are hereby corrected as shown below:

Column 1, lines 18 to 28, both formulas, the portion of the formulas reading "$\sim R^1$", each occurrence, should read -- $\sim R'$ --; line 30, "$R^1$" should read -- $R'$ --.

Signed and sealed this 3rd day of March 1970.

(SEAL)
Attest:

Edward M. Fletcher, Jr.                          WILLIAM E. SCHUYLER, JR.
Attesting Officer                                           Commissioner of Patents